United States Patent
Chandrasekharan et al.

(10) Patent No.: US 12,284,095 B2
(45) Date of Patent: Apr. 22, 2025

(54) SIMPLE NETWORK MANAGEMENT PROTOCOL OBJECT HISTORY COLLECTOR MANAGEMENT INFORMATION BASE TO CURTAIL MANAGEMENT TRAFFIC

(71) Applicant: Juniper Networks, Inc., Sunnyvale, CA (US)

(72) Inventors: Bijoy M. Chandrasekharan, Bangalore (IN); Abhinav Tandon, Dehradun (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/737,317

(22) Filed: May 5, 2022

(65) Prior Publication Data

US 2023/0362078 A1  Nov. 9, 2023

(51) Int. Cl.
| | |
|---|---|
| *H04L 43/065* | (2022.01) |
| *H04L 41/045* | (2022.01) |
| *H04L 43/067* | (2022.01) |
| *H04L 43/0811* | (2022.01) |
| *H04L 41/0213* | (2022.01) |
| *H04L 43/022* | (2022.01) |
| *H04L 43/0817* | (2022.01) |

(52) U.S. Cl.
CPC .......... *H04L 43/065* (2013.01); *H04L 41/045* (2022.05); *H04L 43/067* (2013.01); *H04L 43/0811* (2013.01)

(58) Field of Classification Search
None
See application file for complete search history.

(56) References Cited

U.S. PATENT DOCUMENTS

| | | | | |
|---|---|---|---|---|
| 10,827,079 | B1* | 11/2020 | Mostafa | H04M 15/8214 |
| 2006/0136424 | A1* | 6/2006 | Nuggehalli | G06F 3/1231 |
| 2006/0253499 | A1* | 11/2006 | Zhao | G06F 16/254 |
| 2007/0276932 | A1* | 11/2007 | Sankaran | H04L 41/0213 |
| | | | | 709/223 |
| 2010/0049781 | A1* | 2/2010 | Keeni | H04L 41/046 |
| | | | | 709/224 |
| 2013/0006982 | A1 | 1/2013 | Sun | |

(Continued)

OTHER PUBLICATIONS

Beverly et al., "RTG: a Scalable SNMP Statistics Architecture for Service Providers," Proceedings of the Systems Administration Conference, XP002367699, Nov. 2002, pp. 167-174.

(Continued)

*Primary Examiner* — Kamal M Hossain
(74) *Attorney, Agent, or Firm* — Harrity & Harrity, LLP

(57) ABSTRACT

A network device may poll data for counters of the network device, and may store, for a first time interval, the data polled for the counters in a data structure. The network device may maintain the data polled for the counters in the data structure for a second time interval that is longer than the first time interval, and may receive, from a network management system (NMS), a request for data polled for the counters with the second time interval. The network device may determine, based on the request, whether the NMS is authorized to receive the data polled for the counter, and may provide, to the NMS, the data polled for the counters, with the second time interval, when on the NMS is authorized to receive the data polled for the counters.

20 Claims, 10 Drawing Sheets

(56) References Cited

U.S. PATENT DOCUMENTS

2017/0005886 A1* 1/2017 Dade .................. H04L 41/0604
2020/0120408 A1   4/2020 Boyd et al.
2020/0244773 A1* 7/2020 Venkataswami ........ H04L 67/34
2020/0374334 A1* 11/2020 Shakir ................ H04L 41/0853

OTHER PUBLICATIONS

Extended European Search Report for Application No. EP22179726.9 mailed on Dec. 8, 2022, 10 pages.
Glenn Mansfield Keeni Cyber Solutions Inc., "The Managed Object Aggregation MIB; draft-glenn-mo-aggr-mib-08.txt," The Managed Object Aggregation MIB; Draft-glenn-moaggr-mib-08.txt, Internet Engineering Task Force, IETF; standard working draft, Internet Society (ISOC) 4, XP015043466, Dec. 2005, 37 pages.
Matthew et al., "A Case Study of the Accuracy of SNMP Measurements", Journal of Electrical and Computer Engineering, XP055978363, Jan. 2010, vol. 2010, pp. 1-7, ISSN: 2090-0147, 8 pages, DOI: 10.1155/2010/812979 Retrieved from the Internet: URL:https://downloads.hindawi.com/journals/jece/201 0/812979.pdf.
Waldbusser et al., "Remote Network Monitoring Management Information Base; rfc4502.txt," Internet Engineering Task Force, IETF, Standard, Internet Society (ISOC) 4, XP015046278, May 2006, 142 pages.

* cited by examiner

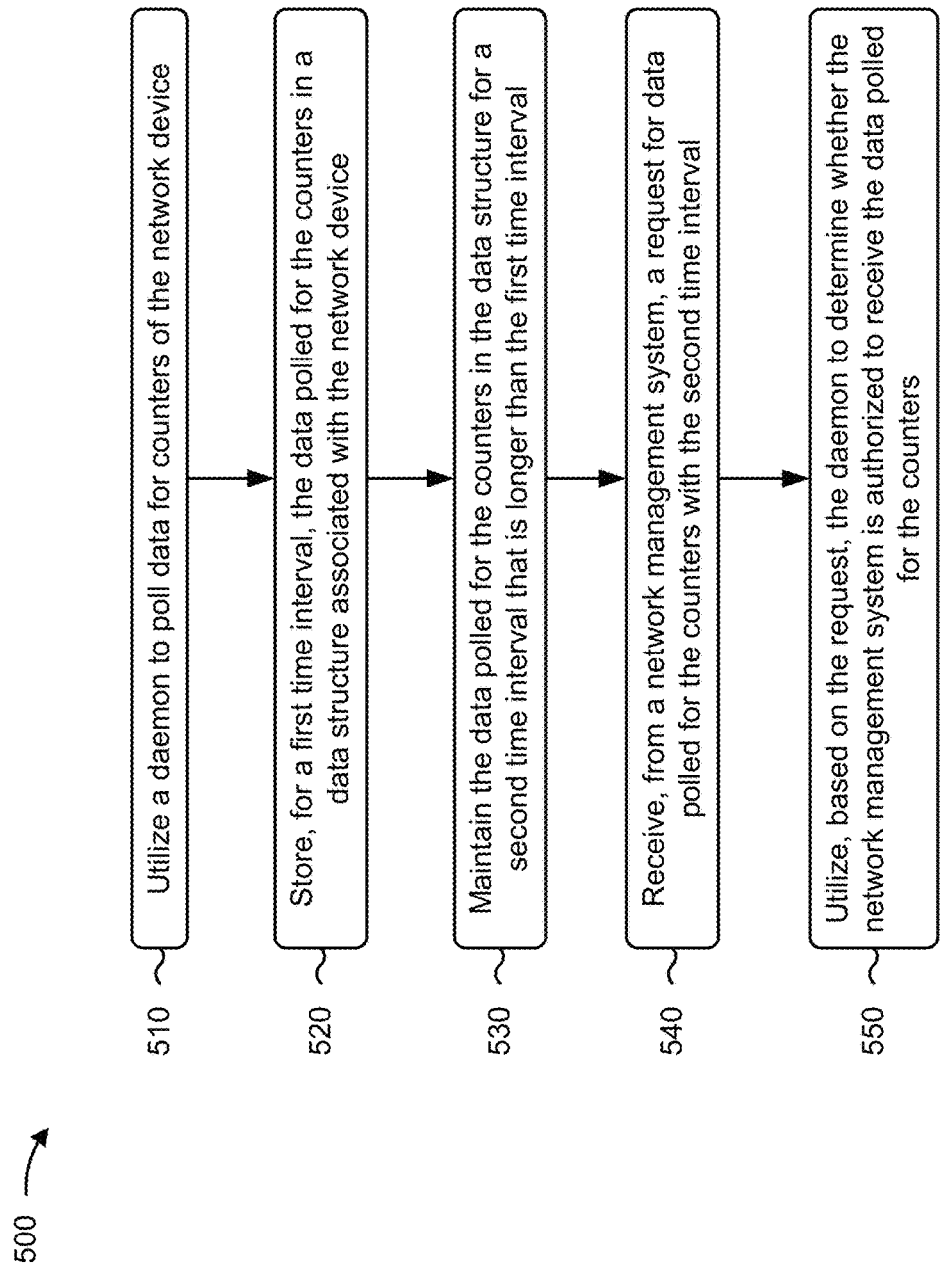

SIMPLE NETWORK MANAGEMENT PROTOCOL OBJECT HISTORY COLLECTOR MANAGEMENT INFORMATION BASE TO CURTAIL MANAGEMENT TRAFFIC

BACKGROUND

The simple network management protocol (SNMP) is an Internet standard protocol for collecting and organizing information about managed devices on networks (e.g., Internet protocol (IP) networks) and for modifying that information to change device behavior. SNMP is widely used in network management for network monitoring. SNMP exposes management data as variables that are organized in a management information base (MIB) describing device status and configuration. Such variables can then be remotely queried by network management systems and/or applications.

SUMMARY

Some implementations described herein relate to a method. The method may include utilizing a daemon to poll data for counters of a network device, and storing, for a first time interval, the data polled for the counters in a data structure associated with the network device. The method may include maintaining the data polled for the counters in the data structure for a second time interval that is longer than the first time interval, and receiving, from a network management system, a request for data polled for the counters with the second time interval. The method may include utilizing, based on the request, the daemon the daemon to determine whether the network management system is authorized to receive the data polled for the counters.

Some implementations described herein relate to a network device. The network device may include one or more memories and one or more processors. The one or more processors may be configured to utilize a daemon to poll data for counters of the network device, and store, for a first time interval, the data polled for the counters in a data structure associated with the network device. The one or more processors may be configured to maintain the data polled for the counters in the data structure for a second time interval that is longer than the first time interval, and receive, from a network management system, a request for data polled for the counters with the second time interval. The one or more processors may be configured to utilize, based on the request, the daemon to determine whether the network management system is authorized to receive the data polled for the counters. The one or more processors may be configured to selectively provide, to the network management system, the data polled for the counters, with the second time interval, based on the network management system being authorized to receive the data polled for the counters, or provide, to the network management system, a message indicating denial of the request based on the network management system not being authorized to receive the data polled for the counters.

Some implementations described herein relate to a non-transitory computer-readable medium that stores a set of instructions for a network device. The set of instructions, when executed by one or more processors of the network device, may cause the network device to poll data for counters of the network device, and store, for a first time interval, the data polled for the counters in a data structure associated with the network device. The set of instructions, when executed by one or more processors of the network device, may cause the network device to maintain the data polled for the counters in the data structure for a second time interval that is longer than the first time interval, and receive, from a network management system, a request for data polled for the counters with the second time interval. The set of instructions, when executed by one or more processors of the network device, may cause the network device to determine, based on the request, whether the network management system is authorized to receive the data polled for the counters.

BRIEF DESCRIPTION OF THE DRAWINGS

FIG. 5 is a flowchart of an example process for storing network management data in a data structure to minimize management data traffic.

DETAILED DESCRIPTION

Figure 1A:
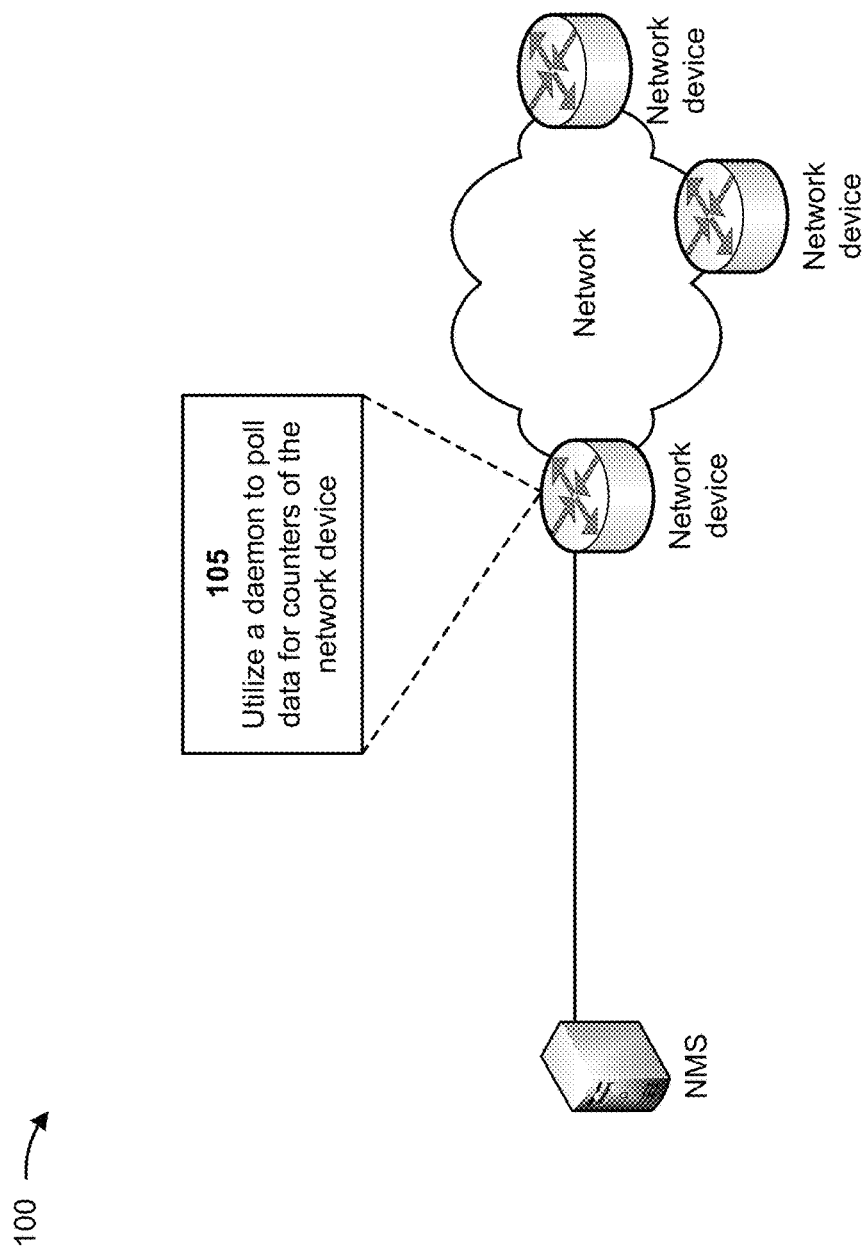
FIGS. 1A-1F are diagrams of an example associated with storing network management data in a data structure to minimize management data traffic.

The following detailed description of example implementations refers to the accompanying drawings. The same reference numbers in different drawings may identify the same or similar elements.

An SNMP daemon of a network device may provide data to counters when the data is polled by a network management system (NMS). An NMS, when managing a network device, may require a particular data granularity (e.g., per second, ten seconds, minute, and/or the like) for the data associated with the network device counters (e.g., network management data). However, the NMS may be required to report (e.g., to a billing system) the network management data only once in a time interval (e.g., in minutes) that is longer than the particular data granularity. This requires all network devices managed by the NMS to be queried (e.g., for the network management data) by the NMS based on the particular data granularity, rather than based on the time interval.

Thus, current techniques for receiving network management data from network devices consume computing resources (e.g., processing resources, memory resources, communication resources, and/or the like), networking resources, and/or the like, associated with reducing network bandwidth based on querying the network devices for the network management data, increasing network traffic based on transmission and/or receipt of queries and the network management data, increasing load on the network devices based on processing the queries for the network management data, authorizing the NMS for each network management data query, and/or the like.

Some implementations described herein relate to a network device that stores network management data in a data structure to minimize management data traffic. For example, a network device may utilize a daemon to poll data for counters of the network device, and may store, for a first time interval, the data polled for the counters in a data structure associated with the network device. The network device may maintain the data polled for the counters in the data structure for a second time interval that is longer than the first time interval, and may receive, from an NMS, a request for data polled for the counters with the second time interval. The network device may utilize, based on the request, the daemon to determine whether the NMS is authorized to receive the data polled for the counters. The network device may selectively provide, to the NMS, the data polled for the counters, with the second time interval, based on the NMS being authorized to receive the data polled for the counters, or provide, to the NMS, a message indicating denial of the request based on the NMS not being authorized to receive the data polled for the counters.

In this way, the network device stores network management data in a data structure to minimize management data traffic. For example, the network device may include a data structure (e.g., an SNMP MIB) that is populated based on querying network management data (e.g., configured object identifiers) associated with the network device based on a first time interval. The network device may store the network management data in the data structure for a second time interval (e.g., determined for an NMS associated with the network device) that is longer than the first time interval. When the second time interval expires, the network device may provide the network management data to the NMS (e.g., based on a query received from the NMS) so that the NMS receives data captured with a granularity of the first time interval. Thus, the network device conserves computing resources, networking resources, and/or the like that would otherwise have been consumed by reducing network bandwidth based on querying the network devices for the network management data, increasing network traffic based on transmission and/or receipt of queries and the network management data, increasing loads on the network devices based on processing the queries for the network management data, authorizing the NMS for each network management data query, and/or the like.

FIGS. 1A-1F are diagrams of an example 100 associated with storing network management data in a data structure to minimize management data traffic. As shown in FIGS. 1A-1F, example 100 includes a network management system (NMS) and a network with a plurality of network devices. Further details of the NMS, the network, and the network devices are provided elsewhere herein.

As further shown in FIG. 1A, and by reference number 105, the network device may utilize a daemon to poll data for counters of the network device. For example, the network device may include a daemon (e.g., an SNMP daemon) that polls the data (e.g., network management data) for the counters of the network device. In some implementations, the daemon may provide the data to the counters at instances when the data is polled by the daemon. In some implementations, the counters may include SNMP counters, such as counters for interfaces, processors, applications, and/or the like associated with the network device.

Figure 1B:
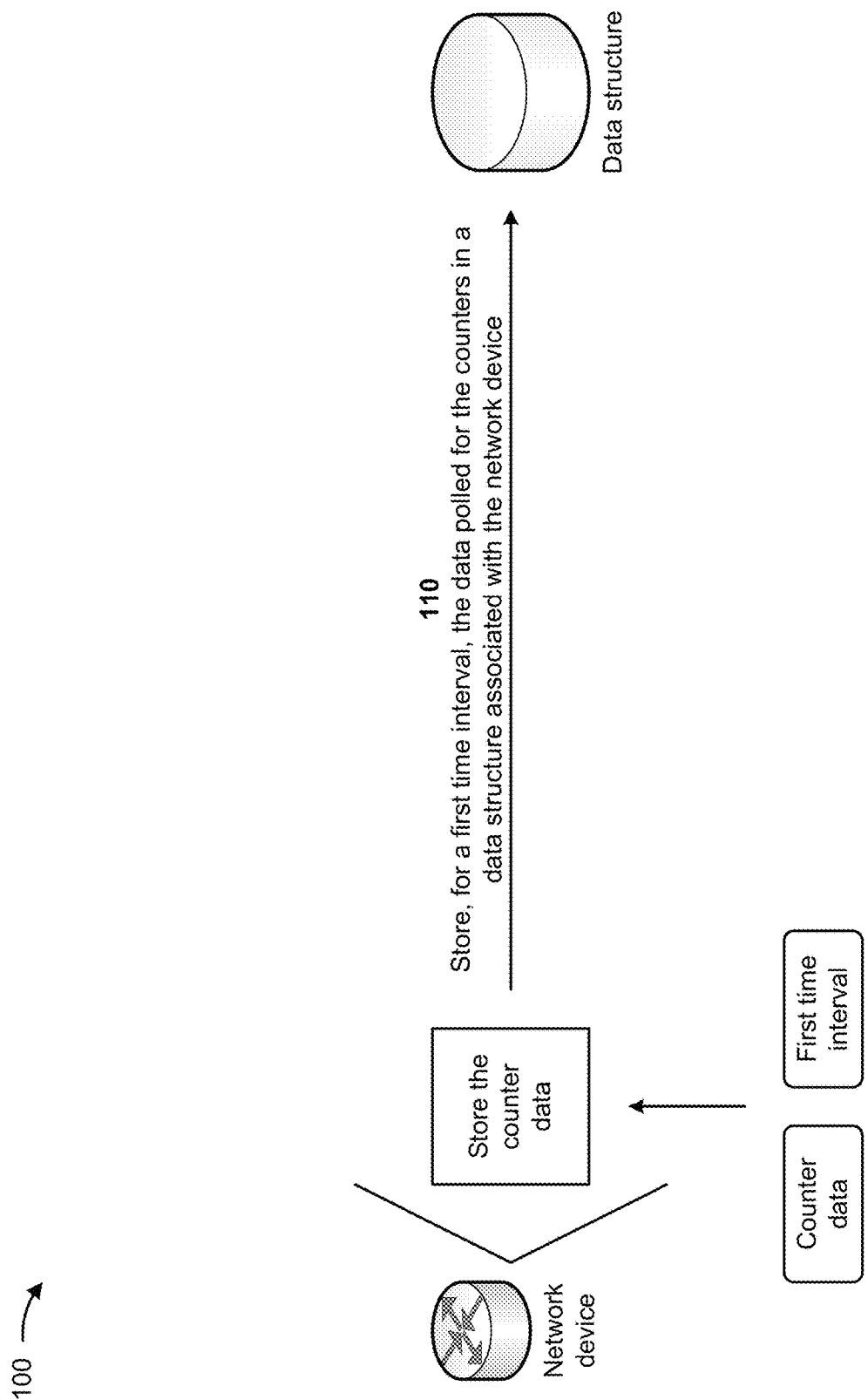

As shown in FIG. 1B, and by reference number 110, the network device may store, at a first time interval, the data polled for the counters in a data structure associated with network device. For example, the network device may include a data structure (e.g., a database, a table, a list, and/or the like), such as a management information base (MIB), which may be populated by querying the polled data (e.g., object identifiers (OIDs)) provided to the counters of the network device. The network device may store the polled data in the data structure at a particular granularity (e.g., the first time interval), such as per second, per multiple seconds, per minute, per multiple minutes, and/or the like. In some implementations, the first time interval may be configured by the network device or by a user of the network device.

Figure 1C:
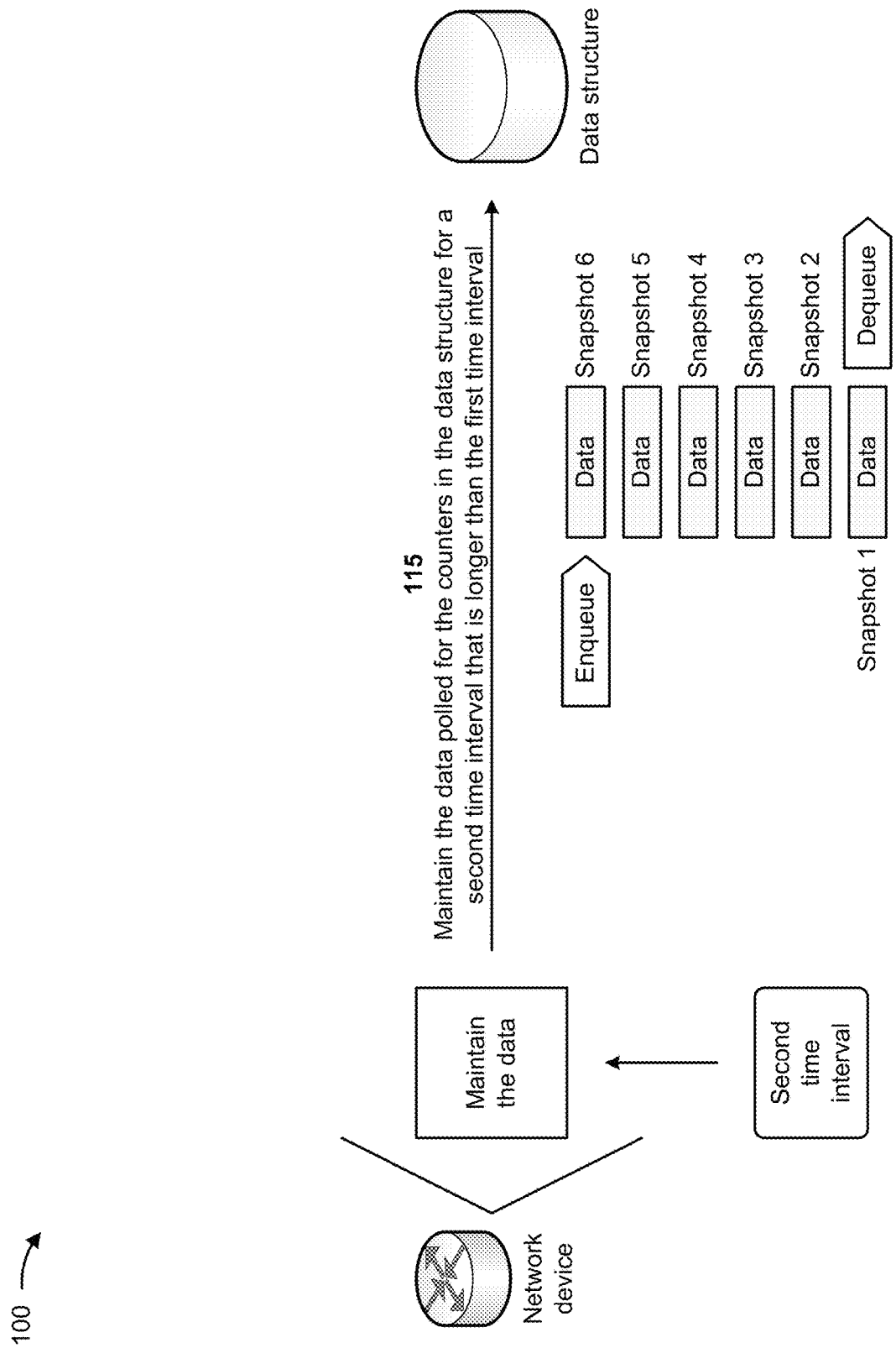

As shown in FIG. 1C, and by reference number 115, the network device may maintain the data polled for the counters in the data structure for a second time interval that is longer than the first time interval. For example, the network device may maintain the polled data in the data structure for a time interval (e.g., the second time interval), such as multiple seconds, one minute, multiple minutes, and/or the like, that is longer than the first time interval. In some implementations, the second time interval may be configured by the network device or by a user of the network device.

In one example, the first time interval may be set to one (1) minute and the second time interval may be set to fifteen (15) minutes for a particular object identifier (OID) to be stored in the data structure (e.g., the MIB), as follows:

```
1) N snapshots of an OID
2) T - Time gap between snapshots
   oidHistoryCollectorMIB
   --------------------
   |--> oidHCConfigTable {oidHCOID}
   |--> oidHCCfgOID // Stats OID for which values are to be collected on the box.
   |--> oidHCCfgSnapshotInterval // Collect snapshot of this OID every T seconds
   (60 seconds)
   |--> oidHCCfgSnapshotCount // Number of snapshots of this OID to be kept in the
   MIB (15)
   |--> oidHCCfgStatus - Row status
   |--> oidHCHistoryTable {oidHCCfgOID, oidHCSnapshotID}
   |--> oidHCSnapshotID // ID of Value snapshot for this OID (1, 2, 3, ..., 15)
   |--> oidHCEpochTime
   |--> oidHCValueType
   |--> oidHCValue.
```

In this example, the network device may store a data point (e.g., a snapshot) of the polled data at each first time interval (e.g., one minute) and for the second time interval (e.g., fifteen minutes). Thus, the network device may store fifteen data points (e.g., snapshots) of the polled data in the data structure. The NMS may query the network device for data points of the polled data every fifteen minutes, which may greatly reduce traffic between the NMS and the network device. The NMS may also query the other network devices for data points every fifteen minutes (e.g., rather than every minute), which may greatly reduce traffic between the NMS and the other network devices.

As further shown in FIG. 1C, an example use case may include six snapshots of data (e.g., for an input octets counter for an interface of the network device) collected by the network device with a first time interval of ten seconds between each snapshot. Each of the six snapshots of the data (e.g., a configured SNMP OID) may be fetched by the daemon of the network device and enqueued by the daemon in a queue (e.g., with six entries) every ten seconds (e.g., based on a configuration for the SNMP OID). Any new snapshot enqueued by the daemon in the queue may displace (e.g., dequeue) an oldest snapshot from a front of the queue.

Figure 1D:
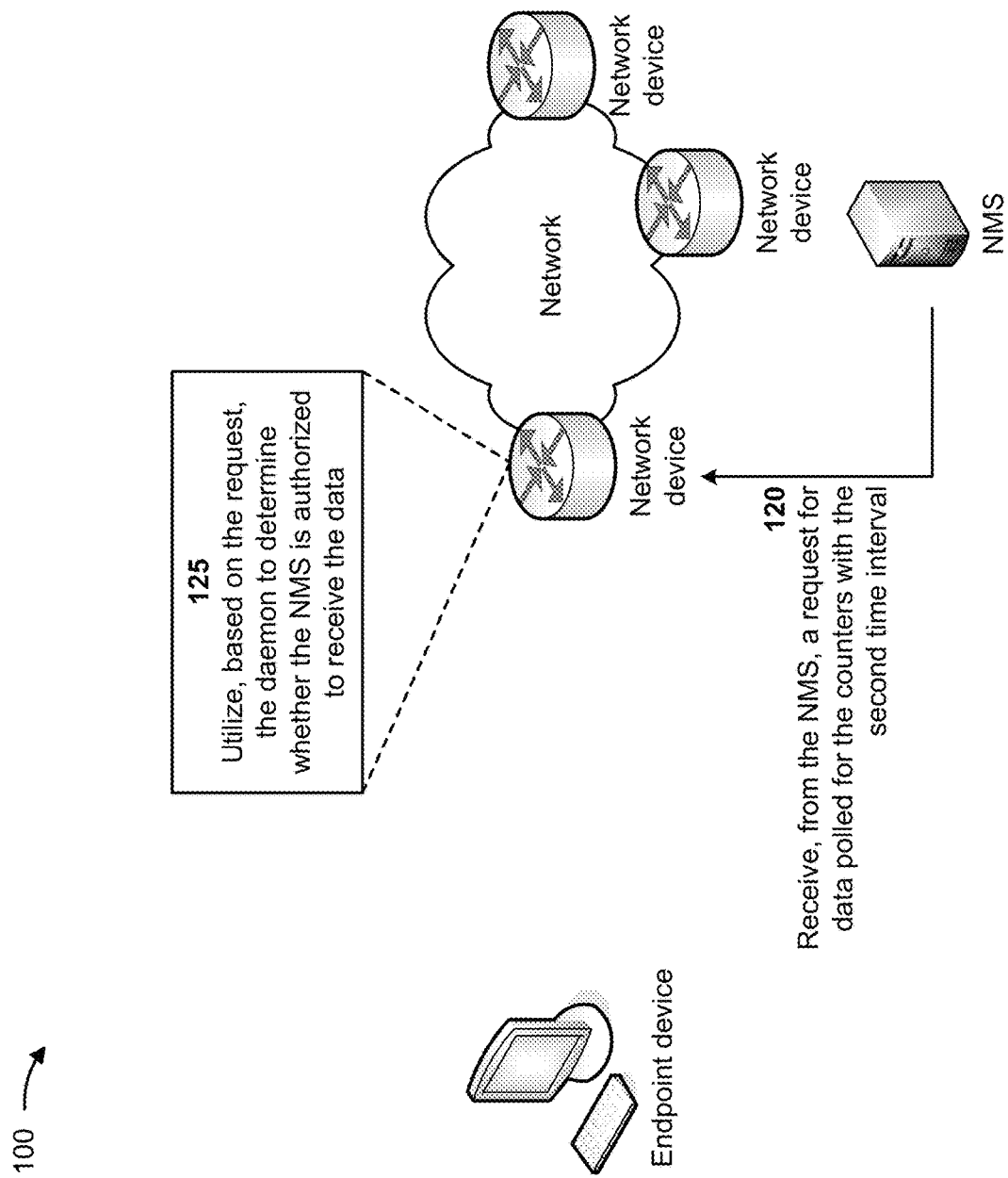

As shown in FIG. 1D, and by reference number 120, the network device may receive, from the NMS, a request for the data polled for the counters with the second time interval. For example, the NMS may generate the request for the data polled by the network device with the second time interval, and may provide the request to the network device. The network device may receive the request from the NMS. The request may query the network device for data points of the polled data with the second time interval, which may greatly reduce traffic between the NMS and the network device.

Based on the use case depicted in FIG. 1C, the request may query a type and a value of the six snapshots in a single request (e.g., a bulk get request), as follows:

determine that the NMS is not authorized to receive the data polled for the counters when the credentials of the NMS are not authenticated by the daemon of the network device.

Figure 1E:
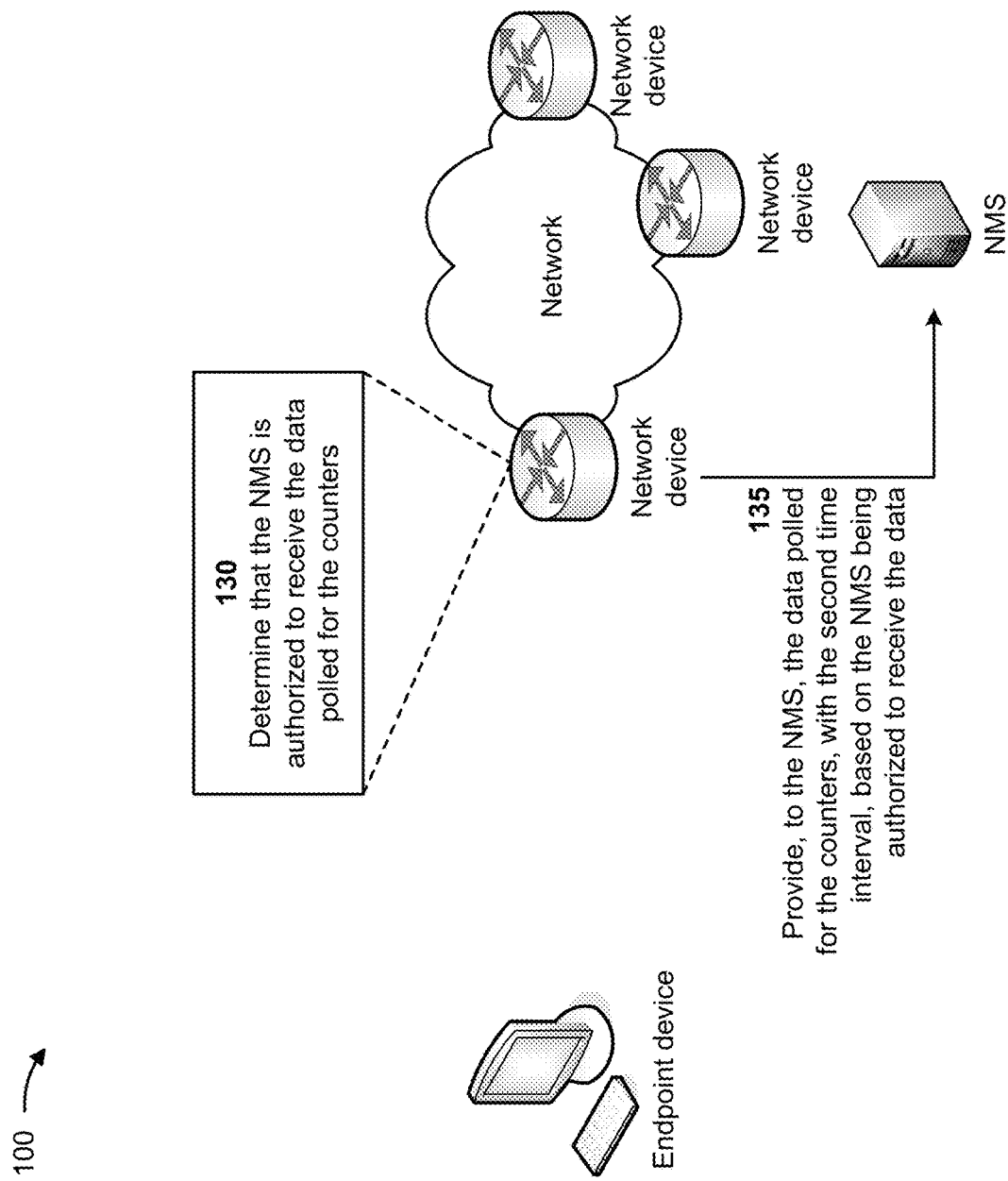

As shown in FIG. 1E, and by reference number 130, the network device may determine that the NMS is authorized to receive the data polled for the counters. For example, the daemon of the network device may determine that the NMS is authorized to receive the data polled for the counters when the credentials of the NMS are authenticated by the daemon of the network device. The daemon may determine that the credentials of the NMS are authentic when the credentials of the NMS match credentials stored in the network device and associated with the NMS and the data polled for the counters.

As further shown in FIG. 1E, and by reference number 135, the network device may provide, to the NMS, the data polled for the counters, with the second time interval, based on the NMS being authorized to receive the data. For example, when the daemon of the network device deter-

```
snmpbulkget -v2c -c public -Cr6 <router-ip> oidHCValueType.ifInOctets.100
oidHCValue.ifInOctets.100
oidHistoryCollectorMIB
|--> oidHCConfigTable {oidHCOID}
   |--> oidHCCfgOID                        <<= ifInOctets.<ifIdx 100>
   |--> oidHCCfgSnapshotInterval           <<= 10 Secs
   |--> oidHCCfgSnapshotCount              <<= 6
   |--> oidHCCfgStatus - Row status        <<= Active
|--> oidHCHistoryTable {oidHCCfgOID, oidHCSnapshotID}
   |--> oidHCSnapshotID        <<= (Count of Interval) example ifInOctets.<ifIndex>.1
                                   (where 1 is oldest collected sample)
   |                           <<= (Count of Interval) example ifInOctets.<ifIndex>.2
   |                           <<= (Count of Interval) example ifInOctets.<ifIndex>.3
   |                           <<= (Count of Interval) example ifInOctets.<ifIndex>.4
   |                           <<= (Count of Interval) example ifInOctets.<ifIndex>.5
   |                           <<= (Count of Interval) example ifInOctets.<ifIndex>.6
   |--> oidHCEpochTime         <<= oidHCEpochTime.ifInOctets.<ifIndex>.1 = EPOCH
                                   (Epoch time for the first sample)
   |                           <<= oidHCEpochTime.ifInOctets.<ifIndex>.2 = EPOCH
   |                           <<= oidHCEpochTime.ifInOctets.<ifIndex>.3 = EPOCH
   |                           <<= oidHCEpochTime.ifInOctets.<ifIndex>.4 = EPOCH
   |                           <<= oidHCEpochTime.ifInOctets.<ifIndex>.5 = EPOCH
   |                           <<= oidHCEpochTime.ifInOctets.<ifIndex>.6 = EPOCH
   |--> oidHCValueType         <<= oidHCValueType.ifInOctets.<ifIndex>.1 = INTEGER
   |                           <<= oidHCValueType.ifInOctets.<ifIndex>.2 = INTEGER
   |                           <<= oidHCValueType.ifInOctets.<ifIndex>.3 = INTEGER
   |                           <<= oidHCValueType.ifInOctets.<ifIndex>.4 = INTEGER
   |                           <<= oidHCValueType.ifInOctets.<ifIndex>.5 = INTEGER
   |                           <<= oidHCValueType.ifInOctets.<ifIndex>.6 = INTEGER
   |--> oidHCValue             <<= oidHCValue. ifInOctets.<ifIndex>.1 = OCTET STRING
                                   (Decoded based on oidHCValueType)
   |                           <<= oidHCValue. ifInOctets.<ifIndex>.2 = OCTET STRING
   |                           <<= oidHCValue. ifInOctets.<ifIndex>.3 = OCTET STRING
   |                           <<= oidHCValue. ifInOctets.<ifIndex>.4 = OCTET STRING
   |                           <<= oidHCValue. ifInOctets.<ifIndex>.5 = OCTET STRING
   |                           <<= oidHCValue. ifInOctets.<ifIndex>.6 = OCTET
                               STRING.
```

As further shown in FIG. 1D, and by reference number 125, the network device may utilize, based on the request, the daemon to determine whether the NMS is authorized to receive the data polled for the counters. For example, the daemon of the network device may analyze credentials of the NMS included in the request for the data polled for the counters with the second time interval, and may determine, based on the credentials, whether the NMS is authorized to receive the data polled for the counters with the second time interval. In some implementations, the daemon of the network device may determine that the NMS is authorized to receive the data polled for the counters when the credentials of the NMS are authenticated by the daemon of the network device. Alternatively, the daemon of the network device may mines that the NMS is authorized to receive the data polled for the counters, the daemon of the network device may provide, to the NMS, the data polled for the counters with the second time interval. The NMS may receive the polled data and may report the polled data to (e.g., to a network billing system).

Figure 1F:
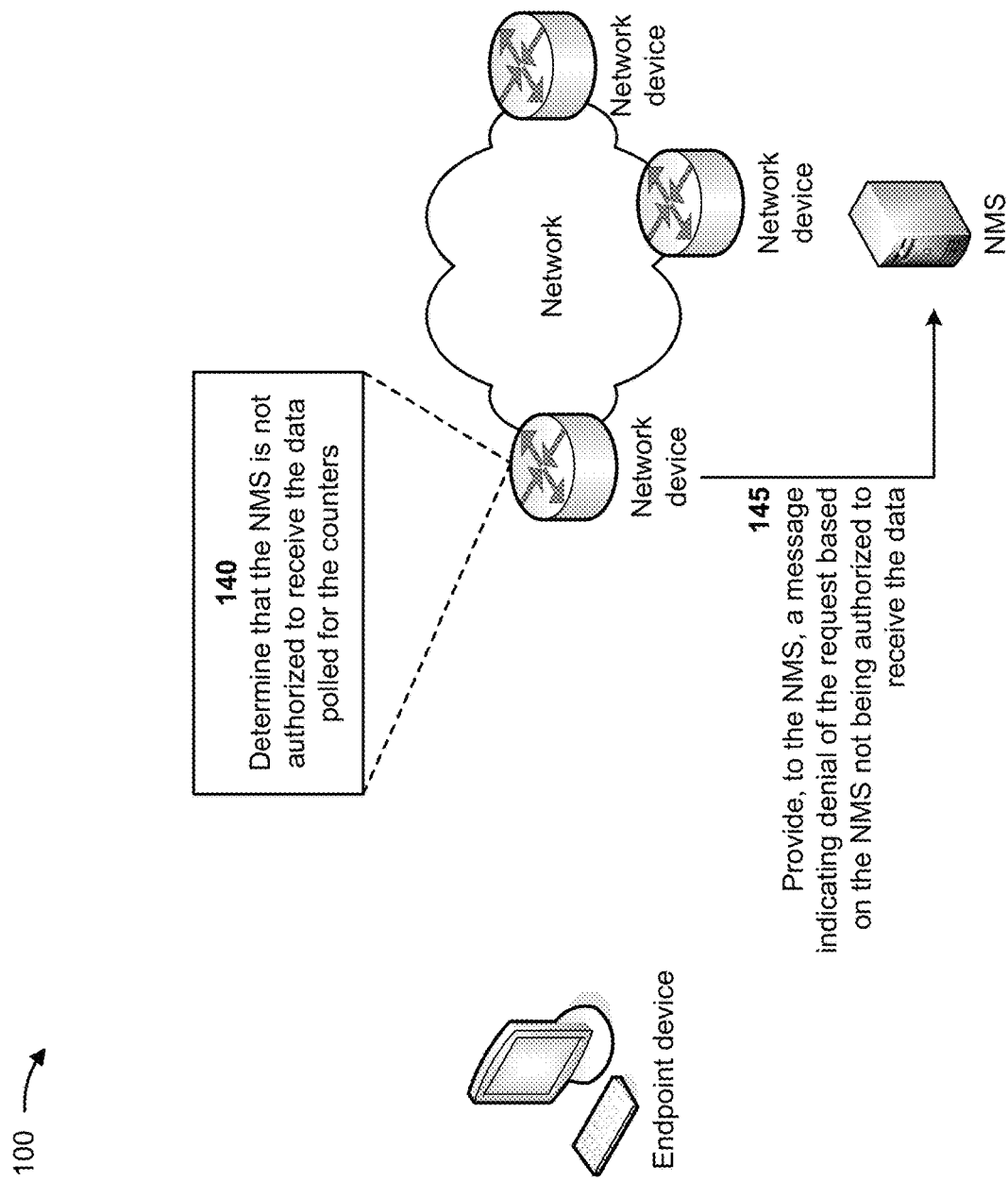

As shown in FIG. 1F, and by reference number 140, the network device may determine that the NMS is not authorized to receive the data polled for the counters. For example, the daemon of the network device may determine that the NMS is not authorized to receive the data polled for the counters when the credentials of the NMS are not authenticated by the daemon of the network device. The daemon may determine that the credentials of the NMS are not authentic when the credentials of the NMS fail to match credentials stored in the network device and associated with the NMS and the data polled for the counters.

As further shown in FIG. 1F, and by reference number 145, the network device may provide, to the NMS, a message indicating denial of the request based on the NMS not being authorized to receive the data. For example, when the daemon of the network device determines that the NMS is not authorized to receive the data polled for the counters, the daemon of the network device may provide, to the NMS, the message indicating denial of the request for the data polled for the counters with the second time interval. In such a scenario, the NMS may not receive the data polled for the counters with the second time interval.

In some implementations, the network device may store historical groups of the polled data over a time period in the data structure. For example, the network device may store the polled data for minutes one through fifteen of a first day in a first historical group of the polled data, may store polled data for minutes sixteen through thirty of the first day in a second historical group of the polled data, and/or the like. In such an example, the NMS may request, from the network device, a particular historical group of the polled data (e.g., minutes thirty-one through forty-five of the first day), and the network device may provide the particular historical group of the polled data to the NMS. In this way, the NMS may utilize the historical groups of polled data to compare a same time period of different days in order to determine whether the network device is experiencing an issue.

In this way, the network device stores network management data in a data structure to minimize management data traffic. For example, the network device may include a data structure that is populated based on querying network management data associated with the network device based on a first time interval. The network device may store the network management data in the data structure for a second time interval that is longer than the first time interval. When the second time interval expires, the network device may provide the network management data to the NMS. Thus, the network device conserves computing resources, networking resources, and/or the like that would otherwise have been consumed by reducing network bandwidth based on querying the network devices for the network management data, increasing network traffic based on transmission and/or receipt of queries and the network management data, increasing loads on the network devices based on processing the queries for the network management data, authorizing the NMS for each network management data query, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
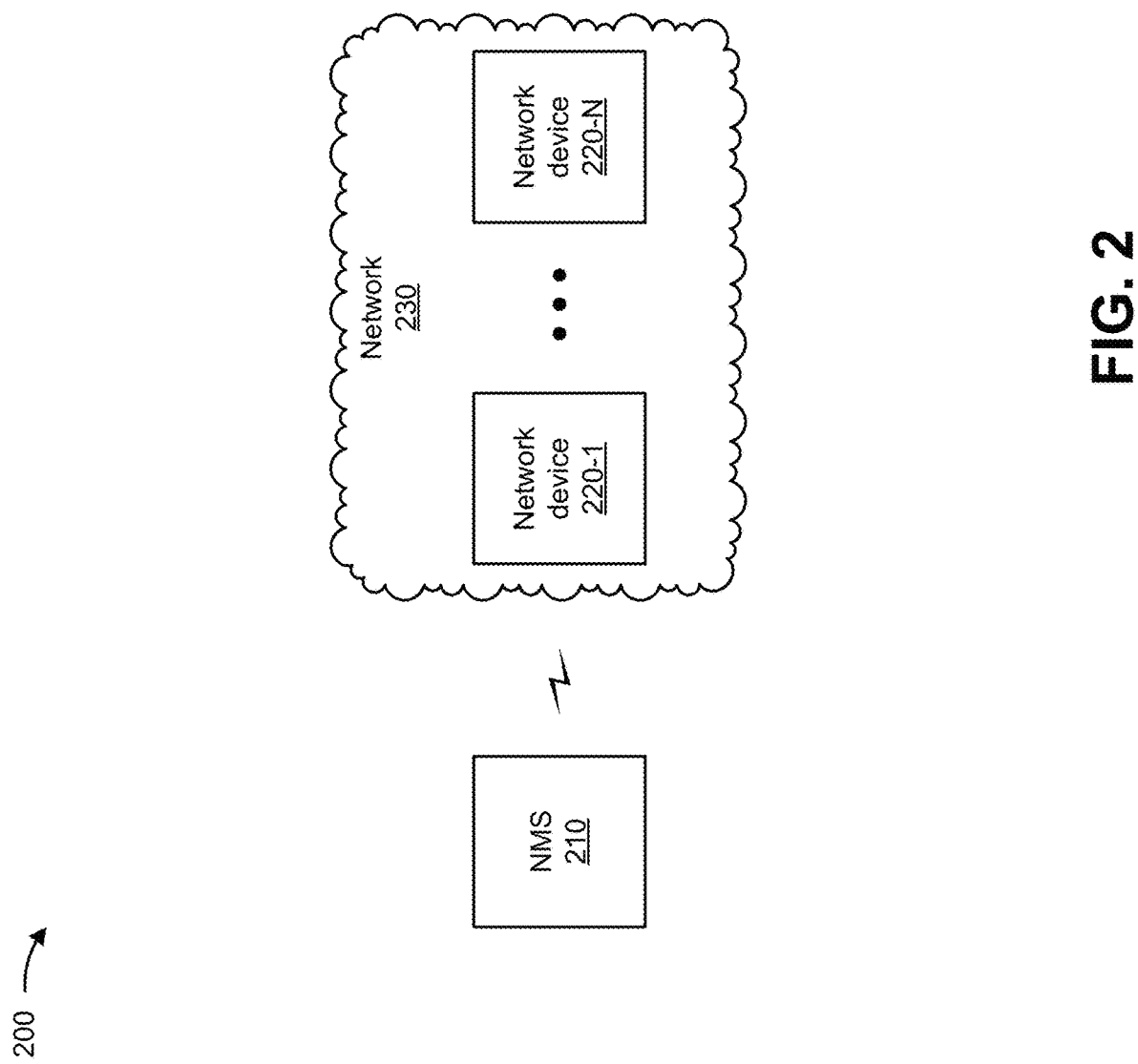
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an NMS 210, a group of network devices 220 (shown as network device 220-1 through network device 220-N), and a network 230. Devices of the environment 200 may interconnect via wired connections, wireless connections, or a combination of wired and wireless connections.

The NMS 210 includes one or more devices capable of receiving, generating, storing, processing, providing, and/or routing information, as described elsewhere herein. The NMS 210 may include a communication device and/or a computing device. For example, the NMS 210 may include a server, such as an application server, a client server, a web server, a database server, a host server, a proxy server, a virtual server (e.g., executing on computing hardware), or a server in a cloud computing system. In some implementations, the NMS 210 includes computing hardware used in a cloud computing environment.

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
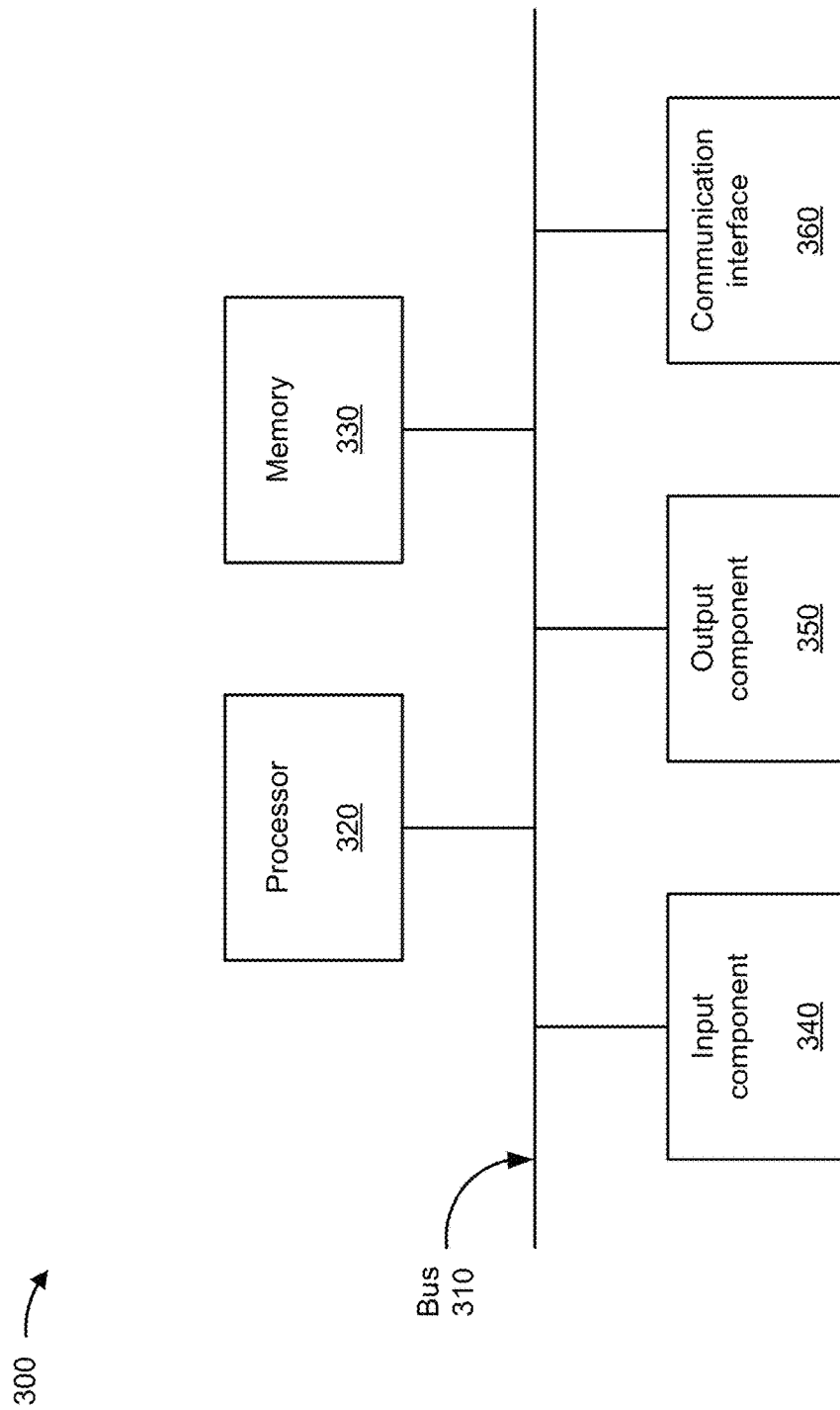
FIGS. 3 and 4 are diagrams of example components of one or more devices of FIG. 2.

FIG. 3 is a diagram of example components of one or more devices of FIG. 2. The example components may be included in a device 300, which may correspond the NMS 210 and/or the network device 220. In some implementations, the NMS 210 and/or the network device 220 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
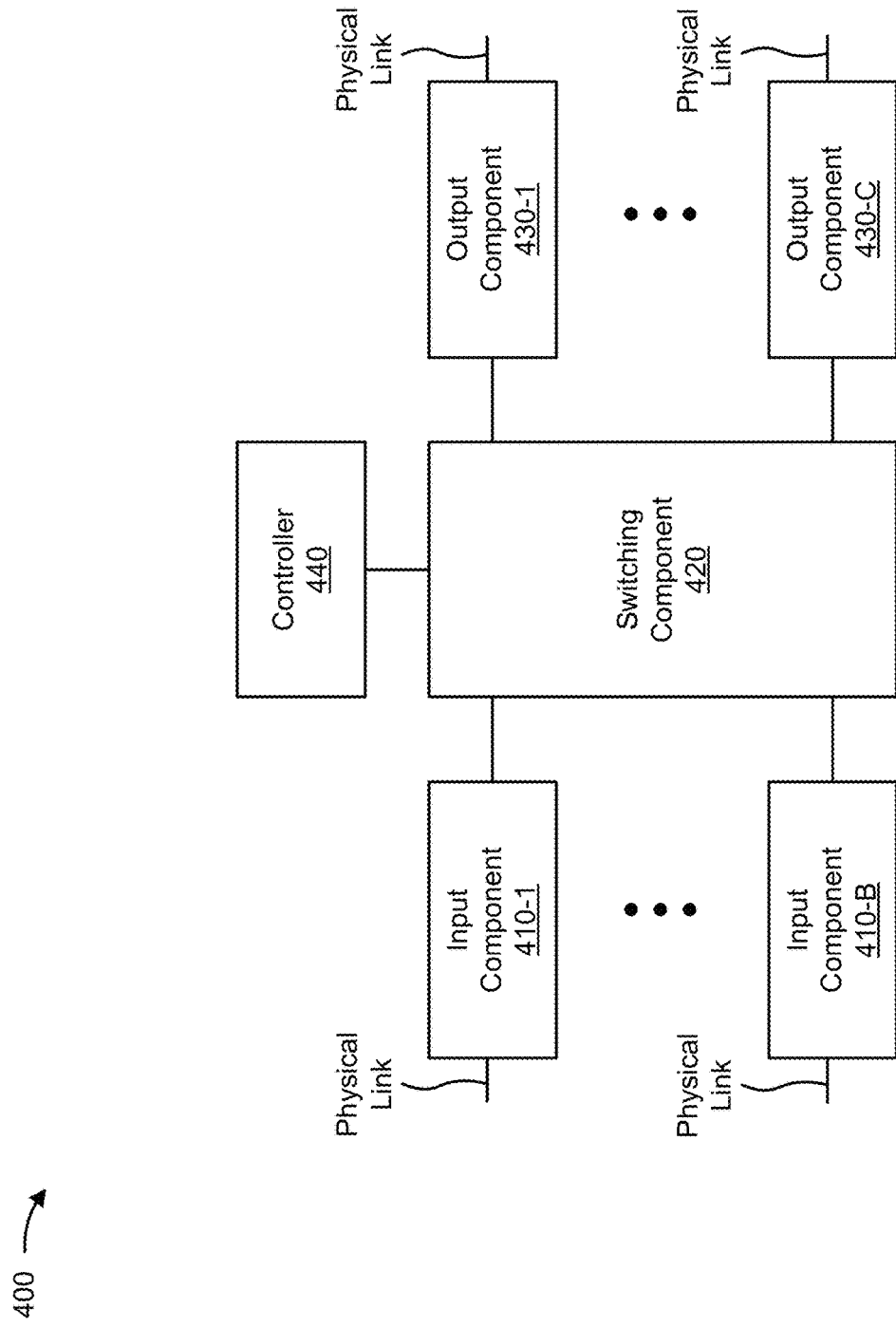

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for storing network management data in a data structure to minimize management data traffic. In some implementations, one or more process blocks of FIG. 5 may be performed by a network device (e.g., the network device 220). In some implementations, one or more process blocks of FIG. 5 may be performed by another device or a group of devices separate from or including the network device, such as an NMS (e.g., the NMS 210). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include utilizing a daemon to poll data for counters of the network device (block 510). For example, the network device may utilize a daemon to poll data for counters of the network device, as described above. In some implementations, the daemon includes a simple network management protocol daemon provided on the network device. In some implementations, the data polled for the counters includes network management data. In some implementations, the data polled for the counters is associated with an object identifier. In some implementations, the data polled for the counters includes simple network management protocol objects.

As further shown in FIG. 5, process 500 may include storing, for a first time interval, the data polled for the counters in a data structure associated with the network device (block 520). For example, the network device may store, for a first time interval, the data polled for the counters in a data structure associated with the network device, as described above. In some implementations, the data structure includes a simple network management protocol management information base. In some implementations, the data structure includes a first-in-first-out queue data structure.

As further shown in FIG. 5, process 500 may include maintaining the data polled for the counters in the data structure for a second time interval that is longer than the first time interval (block 530). For example, the network device may maintain the data polled for the counters in the data structure for a second time interval that is longer than the first time interval, as described above. In some implementations, the first time interval defines a data granularity for the data polled for the counters and the second time interval defines a quantity of data points associated with the data polled for the counters.

As further shown in FIG. 5, process 500 may include receiving, from a network management system, a request for data polled for the counters with the second time interval (block 540). For example, the network device may receive, from a network management system, a request for data polled for the counters with the second time interval, as described above.

As further shown in FIG. 5, process 500 may include utilizing, based on the request, the daemon to determine whether the network management system is authorized to receive the data polled for the counters (block 550). For example, the network device may utilize, based on the request, the daemon to determine whether the network management system is authorized to receive the data polled for the counters, as described above.

In some implementations, process 500 includes determining, by the daemon, that the network management system is not authorized to receive the data polled for the counters, and providing, to the network management system, a message indicating denial of the request based on the daemon determining that the network management system is not authorized to receive the data polled for the counters.

In some implementations, process 500 includes determining, by the daemon, that the network management system is authorized to receive the data polled for the counters, and providing, to the network management system, the data polled for the counters, with the second time interval, based on the daemon determining that the network management system is authorized to receive the data polled for the counters.

In some implementations, process 500 includes receiving, from the network management system, another request for additional data polled for the counters with another second time interval, utilizing, based on the other request, the daemon to determine that the network management system is not authorized to receive the additional data polled for the counters, and providing, to the network management system, a message indicating denial of the other request based on the daemon determining that the network management system is not authorized to receive the additional data polled for the counters.

In some implementations, process 500 includes removing the data polled for the counters from the data structure after providing the data polled for the counters to the network management system. In some implementations, process 500 includes removing the data polled for the counters from the data structure after the second time interval expires.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   utilizing, by a network device, a daemon to poll data for counters of the network device;
   storing, by the network device and for a first time interval, data polled for the counters in a data structure associated with the network device;
   maintaining, by the network device, the data polled for the counters in the data structure for a second time interval that is longer than the first time interval,
      wherein the second time interval corresponds to a reporting requirement of a billing system,
      wherein the second time interval is a multiple of the first time interval,
      wherein the data structure holds a number of data entries equal to a number corresponding to the multiple of the first time interval, and
      wherein new data points, of the data polled for the counters, in the data structure displace oldest data points, of the data polled for the counters, in the data structure;
   receiving, by the network device, from a network management system, and based on the reporting requirement of the billing system, a request for the data polled for the counters associated with the second time interval;
   utilizing, by the network device and based on the request, the daemon to determine whether the network management system is authorized to receive the data polled for the counters; and
   selectively providing, by the network device and based on determining whether the network management system is authorized to receive the data polled for the counters, one of the data polled for the counters or a message indicating denial of the request,
      wherein, when the network management system is determined to be authorized to receive the data polled for the counters, the data polled for the counters is provided recurringly at the second time interval, based on queries, to cause the data to be reported in accordance with the reporting requirement of the billing system.

2. The method of claim 1, further comprising:
   determining, by the daemon, that the network management system is not authorized to receive the data polled for the counters,
   wherein selectively providing one of the data polled for the counters or the message indicating denial of the request comprises:

providing, to the network management system, the message indicating denial of the request based on the daemon determining that the network management system is not authorized to receive the data polled for the counters.

3. The method of claim 1, further comprising:
determining, by the daemon, that the network management system is authorized to receive the data polled for the counters,
wherein selectively providing one of the data polled for the counters or the message indicating denial of the request comprises:
providing, to the network management system, the data polled for the counters, based on the daemon determining that the network management system is authorized to receive the data polled for the counters.

4. The method of claim 1, wherein the daemon includes a simple network management protocol daemon provided on the network device.

5. The method of claim 1, wherein the data polled for the counters includes network management data.

6. The method of claim 1, wherein the data structure includes a simple network management protocol management information base.

7. The method of claim 1, wherein the data structure includes a first-in-first-out queue data structure.

8. A network device, comprising:
one or more memories; and
one or more processors to:
utilize a daemon to poll data for counters of the network device;
store, for a first time interval, data polled for the counters in a data structure associated with the network device;
maintain the data polled for the counters in the data structure for a second time interval that is longer than the first time interval,
wherein the second time interval corresponds to a reporting requirement of a billing system
wherein the second time interval is a multiple of the first time interval,
wherein the data structure holds a number of data entries equal to a number corresponding to the multiple of the first time interval, and
wherein new data points, of the data polled for the counters, in the data structure displace oldest data points, of the data polled for the counters, in the data structure;
receive, from a network management system and based on the reporting requirement of the billing system, a request for the data polled for the counters associated with the second time interval; and
selectively:
provide, to the network management system, the data polled for the counters, based on the network management system being authorized to receive the data polled for the counters,
wherein the data polled for the counters is provided recurringly at the second time interval, based on queries, to cause the data polled for the counters to be reported in accordance with the reporting requirement of the billing system, or
provide, to the network management system, a message indicating denial of the request based on the network management system not being authorized to receive the data polled for the counters.

9. The network device of claim 8, wherein the data polled for the counters is associated with an object identifier.

10. The network device of claim 8, wherein the first time interval defines a data granularity for the data polled for the counters and the second time interval defines a quantity of data points associated with the data polled for the counters.

11. The network device of claim 8, wherein the one or more processors are further to:
utilize, based on the request, the daemon to determine that the network management system is not authorized to receive the data polled for the counters; and
wherein the one or more processors, when selectively providing the data polled for the counters or the message indicating denial of the request, are to:
provide, to the network management system, the message indicating denial of the request based on the daemon determining that the network management system is not authorized to receive the data polled for the counters.

12. The network device of claim 8, wherein the data polled for the counters includes simple network management protocol objects.

13. The network device of claim 8, wherein the one or more processors are further to:
remove the data polled for the counters from the data structure after providing the data polled for the counters to the network management system.

14. The network device of claim 8, wherein the one or more processors are further to:
remove the data polled for the counters from the data structure after the second time interval expires.

15. A non-transitory computer-readable medium storing a set of instructions, the set of instructions comprising:
one or more instructions that, when executed by one or more processors of a network device, cause the network device to:
poll data for counters of the network device;
store, for a first time interval, the data polled for the counters in a data structure associated with the network device;
maintain the data polled for the counters in the data structure for a second time interval that is longer than the first time interval,
wherein the second time interval corresponds to a reporting requirement of a billing system,
wherein the second time interval is a multiple of the first time interval,
wherein the data structure holds a number of data entries equal to a number corresponding to the multiple of the first time interval, and
wherein new data points, of the data polled for the counters, in the data structure displace oldest data points, of the data polled for the counters, in the data structure;
receive, from a network management system and based on the reporting requirement of the billing system, a request for the data polled for the counters associated with the second time interval;
determine, based on the request, whether the network management system is authorized to receive the data polled for the counters; and
selectively provide, based on determining whether the network management system is authorized to receive the data polled for the counters, one of the data polled for the counters or a message indicating denial of the request, wherein, when the network management system is determined to be authorized to receive the data polled for the counters, the data polled for the counters is provided recurringly at the second time interval, based on queries, to cause the data polled for the counters to be reported in accordance with the reporting requirement of the billing system.

16. The non-transitory computer-readable medium of claim 15, wherein the one or more instructions, that cause the network device to determine whether the network management system is authorized to receive the data polled for the counters, cause the network device to:
  determine that the network management system is not authorized to receive the data polled for the counters; and
  wherein, the one or more instructions, that cause the network device to selectively provide one of the data polled for the counters or the message indicating denial of the request, cause the network device to:
    provide, to the network management system, the message indicating denial of the request based on determining that the network management system is not authorized to receive the data polled for the counters.

17. The non-transitory computer-readable medium of claim 15, wherein the one or more instructions, that cause the network device to determine whether the network management system is authorized to receive the data polled for the counters, cause the network device to:
  determine that the network management system is authorized to receive the data polled for the counters; and
  wherein the one or more instructions, that cause the network device to selectively provide one of the data polled for the counters or the message indicating denial of the request, cause the network device to:
    provide, to the network management system, the data polled for the counters, based on determining that the network management system is authorized to receive the data polled for the counters.

18. The non-transitory computer-readable medium of claim 15, wherein the data polled for the counters includes network management data.

19. The non-transitory computer-readable medium of claim 15, wherein the data structure includes a simple network management protocol management information base.

20. The non-transitory computer-readable medium of claim 15, wherein the first time interval defines a data granularity for the data polled for the counters and the second time interval defines a quantity of data points associated with the data polled for the counters.

* * * * *